United States Patent
Hwang et al.

(10) Patent No.: US 8,259,631 B2
(45) Date of Patent: Sep. 4, 2012

(54) APPARATUS AND METHOD FOR TIME-VARYING CYCLIC DELAY DIVERSITY IN A WIRELESS COMMUNICATION SYSTEM

(75) Inventors: Yong-Sun Hwang, Suwon-si (KR); Jeong-Soon Park, Suwon-si (KR); Yong-Won Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 12/325,457

(22) Filed: Dec. 1, 2008

(65) Prior Publication Data

US 2009/0141620 A1 Jun. 4, 2009

(30) Foreign Application Priority Data

Nov. 30, 2007 (KR) .................. 10-2007-0123264

(51) Int. Cl.
*H04B 7/00* (2006.01)
(52) U.S. Cl. .................................................. 370/310
(58) Field of Classification Search .............. 370/310, 370/328, 345, 349, 350; 375/259, 260, 267, 375/295; 455/403, 422, 91, 101–105
See application file for complete search history.

(56) References Cited

U.S. PATENT DOCUMENTS

| 7,423,989 | B2 * | 9/2008 | Hansen et al. ............... 370/328 |
| 7,613,104 | B2 * | 11/2009 | Bhatt et al. .................... 370/208 |
| 2005/0163236 | A1 * | 7/2005 | Hammerschmidt et al. .. 375/260 |
| 2005/0254592 | A1 | 11/2005 | Naguib et al. |
| 2007/0098101 | A1 | 5/2007 | Kondylis |
| 2008/0298264 | A1 * | 12/2008 | Ramesh et al. ............... 370/252 |
| 2009/0005120 | A1 * | 1/2009 | Ylitalo ........................ 455/562.1 |
| 2009/0116575 | A1 * | 5/2009 | Hochwald et al. ............ 375/267 |

* cited by examiner

*Primary Examiner* — Dmitry H Levitan
(74) *Attorney, Agent, or Firm* — Jefferson IP Law, LLP

(57) ABSTRACT

An apparatus and method for Time-Varying Cyclic Delay Diversity (TV-CDD) in a wireless communication system are provided. The method includes, if there is a signal of an antenna path to be transmitted, determining if a current time corresponds to a preamble zone within a frame and, if the current time corresponds to the preamble zone within the frame, shifting a partial antenna path signal forward compared to a reference timing and shifting a remaining partial antenna path signal equally or backward compared to the reference timing.

17 Claims, 8 Drawing Sheets

APPARATUS AND METHOD FOR TIME-VARYING CYCLIC DELAY DIVERSITY IN A WIRELESS COMMUNICATION SYSTEM

PRIORITY

This application claims the benefit under 35 U.S.C. §119 (a) of a Korean patent application filed in the Korean Intellectual Property Office on Nov. 30, 2007 and assigned Serial No. 10-2007-0123264, the entire disclosure of which is hereby incorporated by reference.

BACKGROUND OF THE INVENTION

1. Field of the Invention

The present invention relates to an apparatus and method for Time-Varying Cyclic Delay Diversity (TV-CDD) in a wireless communication system. More particularly, the present invention relates to an apparatus and method for varying a scheme of applying a cyclic shift of a preamble zone and data zone in an Orthogonal Frequency Division Multiplexing (OFDM) wireless communication system employing a TV-CDD scheme.

2. Description of the Related Art

The term diversity refers to the use of a plurality of versions of a given signal. By employing diversity, a diversity effect may be realized whereby, even when some versions of the signal experience a problem in transmission, reception can still be facilitated with the remaining versions of the signal. A wireless channel that a signal goes through during transmission in a wireless communication system has a different characteristic depending on a space, a time, a frequency, a phase, etc. A receiver can obtain the diversity effect using a plurality of versions of the same signal that differ in at least one characteristic as the same signal goes through a channel.

More specifically, in a wireless channel environment, there are several propagation paths for a signal between a transmitter and a receiver. Each propagation path can apply time-varying fading to a corresponding signal and can have a different construction and at least one characteristic depending on a position of a receive antenna. Therefore, the receiver can obtain a diversity effect based on at least one of space, time, and frequency using the construction and at least one characteristic of the propagation path.

As such, the diversity effect can increase by transmitting several versions of a signal. That is, a transmitter generates and transmits a plurality of versions of a signal each having at least one different characteristic of space, time, frequency, etc. Consistent with the transmission diversity method described above, there is a method for separating the signal into similar versions of the signal that are different from each other in at least one of space, time, frequency, etc. for transmission and a method for controlling a transmitted signal to intentionally have a specific property during reception.

Cyclic Delay Diversity (CDD) is a type of a transmission diversity scheme. The CDD is a method for increasing a frequency selectivity of an effective channel seen from a received signal. More specifically, the CDD applies, by a different amount of time, a cyclic shift to each antenna element transmitting the same symbol if one data symbol is transmitted from a transmit antenna to two or more antenna elements, that is, if a Multiple Input Multiple Output/Multiple Input Single Output (MIMO/MISO) channel is converted to a Single Input Multiple Output/Single Input Single Output (SIMO/SISO) channel.

FIG. 1 illustrates an example of cyclically shifting, by a D-sample duration, samples constituting an Orthogonal Frequency Division Multiplexing (OFDM) symbol in an OFDM system according to the conventional art.

Referring to FIG. 1, an original version of an OFDM symbol comprised of a data duration with N samples and a Cyclic Prefix (CP) duration with L samples, and a cyclically shifted version of the OFDM symbol, are illustrated. Here, a subscript of a sample 'S' denotes a time index. In addition, CDD can identify that, if samples constituting a symbol are out of an original symbol duration due to a set shift, the samples are shifted before the symbol.

The CDD scheme provides the principal effects of a conversion of space diversity into frequency diversity and a constructive aggregation of a transmitted signal. First, the CDD scheme has an advantage of having no influence on a shift spread of an effective channel because a cyclic shift of a given OFDM symbol does not cause Inter-Symbol Interference (ISI) on a next symbol and simultaneously increases a frequency selectivity of a channel, thereby increasing a frequency diversity effect. In particular, the diversity effect is increased in a channel having a relatively small frequency selectivity. Second, the CDD scheme can decrease a probability of, during transmission, destructively combining a signal transmitted by each antenna and can increase a probability of constructively combining the signal, by controlling a shift length for each antenna element when using CDD. Because of the reasons stated above, the CDD is in use or is being contemplated for use in a variety of OFDM systems such as systems based on the Institute of Electrical and Electronics Engineers (IEEE) 802.11 and 802.16 standards.

However, the unlimited use of CDD in an OFDM system can negatively influence functions of channel estimation of a receiver, timing synchronization, etc. as described below.

First, because a time average is taken for a performance improvement in channel estimation of a receiver, if there is a change of a parameter such as a transmit power or number of transmit antenna elements depending on time (i.e., a symbol) within one frame when using CDD, the performance of a channel estimation scheme of a receiver can deteriorate.

Second, if a length of a cyclic shift of the CDD increases more than a preset level, that is, if a frequency selectivity of an effective channel increases more than a preset level, a channel coherence bandwidth decreases compared to a pilot interval of a given OFDM system, thus leading to a failure of a follow-up channel estimation of a receiver.

Third, the use of CDD can lead to a variation of a multipath profile of an effective channel seen from a receiver, thus causing ISI due to an error of a selection of a Fast Fourier Transform (FFT) sampling point of a receiver.

Estimating an FFT sampling point, that is, a start point of a time-axis sample duration (i.e., an FFT window) selected for input to an FFT unit in a receiver of an OFDM system, uses a correlation characteristic of a known part (e.g., a preamble and midamble) of a received signal.

FIG. 2 illustrates an example of a variation of a multipath profile of a received signal caused by CDD in a receiver of an OFDM system according to the conventional art. In FIG. 2, a channel multipath profile is viewed based on a start point of a data duration (i.e., an FFT sampling point).

Referring to FIG. 2, a channel multipath profile 205 seen from a correlator of a receiver is equal to a sum of multipath profiles 201 and 203 for an original signal and each signal applying a cyclic shift. The aforementioned suggests a possibility of a problem that, if a length of a cyclic shift of CDD is more than a preset level, a channel shift spread seen from the receiver can exceed a CP duration and a possibility of a problem that the use of CDD can lead to an increase of a probability of an error of a selection of an FFT sampling point. The conditions of generating the error of the selection of the FFT sampling point can be described through an example of a system in which two antenna elements each use a different cyclic shift in a single path channel, as described below with reference to FIG. 3.

FIG. 3 illustrates a process of generating an error of a selection of an FFT sampling point of a receiver and its influence in a 2-antenna OFDM system employing a CDD scheme according to the conventional art.

Here, a $0^{th}$ CDD signal 301 is equal to a reference signal that does not have a cyclic shift, and a $1^{st}$ CDD signal 303 is equal to a signal that does have a cyclic shift. A path 0 (305) represents a channel response corresponding to the $0^{th}$ CDD signal 301, and a path 1 (307) represents a channel response corresponding to the $1^{st}$ CDD signal 303. On the assumption that the two antenna elements have the same gain, a two equal-gain path channel 309 comprised of the path 0 (305) and path 1 (307) having a time difference of as much as a cyclic shift is seen from a correlator of a receiver. The two paths each suffer different fading. Thus, if the $0^{th}$ CDD signal 301 suffers a deep fade and the $1^{st}$ CDD signal 303 does not, only the path 1 (307) can be significantly seen in an estimated channel response.

Thus, a receiver can select a position of the path 1 (307) as an FFT sampling point. That is, the receiver can apply an FFT window 0 (311) to a time-axis sample duration. However, in the system, an accurate time-axis sample duration corresponds to an FFT window 0 (311) having a position of the path 0 (305) as an FFT sampling point and thus, if an FFT window 1 (313) is applied to the time-axis sample duration, ISI is generated including a CP duration of a next symbol by as much as a cyclic shift length. An amount of ISI generated as described above increases in proportion to the cyclic shift length. In a multipath channel, a possibility of not selecting a dominant path of the $0^{th}$ CDD signal 301 but instead selecting a dominant path of the $1^{st}$ CDD signal 303 as an FFT sampling point increases. This is because a position of a secondary path of the $0^{th}$ CDD signal 301 is similar to a position of a dominant path of the $1^{st}$ CDD signal 303, thus leading to an increase of a correlation value of a corresponding position.

Such a problem of an error of a selection of an FFT sampling point does not take place in a general multipath environment but takes place in the case of applying the CDD scheme. In the case of not applying the CDD scheme, although a reference path in a general multipath channel suffers deep fading and thus a different path on time is selected as an FFT sampling point, a new reference path becomes an accurate FFT sampling point because a signal energy corresponding to a previous reference path is negligibly weak. In the case of applying the CDD scheme, a reference FFT sampling point is the same for all CDD signals and therefore, an error of a selection of a time-axis sample duration takes place if a path not applying a cyclic shift is lost and a position of a different path is taken as an FFT sampling point.

Among the aforementioned problems, the problem that occurs because the time average is taken for a performance improvement in the channel estimation of the receiver can be solved by limiting a time-dependent variation of a signal power, number of antennas, etc. in a transmitter. In addition, the problem that occurs because the length of the cyclic shift of CDD increases more than a preset level can be reduced if a maximum allowance value of a length of a cyclic shift is set considering a minimum value of an expected channel coherence bandwidth and a pilot interval on the standard of a given system. However, there is a persistent problem of a possible error of a selection of an FFT sampling point at the time of applying the CDD scheme. More particularly, when a length of a cyclic shift is high enough or a shift spread of a channel is high, there is a problem that a deterioration of performance caused by ISI is much higher than a diversity effect obtained by applying the CDD scheme.

SUMMARY OF THE INVENTION

An aspect of the present invention is to address at least the above-mentioned problems and/or disadvantages and to provide at least the advantages described below. Accordingly, one aspect of the present invention is to provide an apparatus and method for Time-Varying Cyclic Delay Diversity (TV-CDD) in a wireless communication system.

Another aspect of the present invention is to provide an apparatus and method for varying a scheme of applying a cyclic shift of a preamble zone and data zone in a wireless communication system employing a TV-CDD scheme.

A further aspect of the present invention is to provide an apparatus and method for shifting a partial antenna path signal forward compared to reference timing and shifting a remaining partial antenna path signal backward compared to the reference timing in a preamble zone within a frame in a wireless communication system employing a TV-CDD scheme.

The above aspects are addressed by providing an apparatus and method for TV-CDD in a wireless communication system.

In accordance with one aspect of the present invention, a method for applying a shift in a transmitter of a wireless communication system is provided. The method includes, if there is a signal of an antenna path to be transmitted, determining if a current time corresponds to a preamble zone within a frame and, if the current time corresponds to the preamble zone within the frame, shifting a partial antenna path signal forward compared to a reference timing and shifting a remaining partial antenna path signal equally or backward compared to the reference timing.

In accordance with another aspect of the present invention, an apparatus for a applying a shift in a transmitter of a wireless communication system is provided. The apparatus includes an Inverse Fast Fourier Transform (IFFT) unit and a cycle shift unit. The IFFT unit performs an IFFT operation for a signal of an antenna path to be transmitted. The cycle shift unit determines if a current time corresponds to a preamble zone within a frame and, if the current time corresponds to the preamble zone within the frame, shifts a partial antenna path signal among the IFFT operated signals forward compared to reference timing and shifts a remaining partial antenna path signal equally or backward compared to the reference timing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An apparatus and method for varying a scheme of applying a cyclic shift of a preamble zone and data zone in an Orthogonal Frequency Multiple Multiplexing (OFDM) system employing a Time-Varying Cyclic Delay Diversity (TV-CDD) scheme in a wireless communication system according to exemplary embodiments of the present invention are described below.

Figure 4:
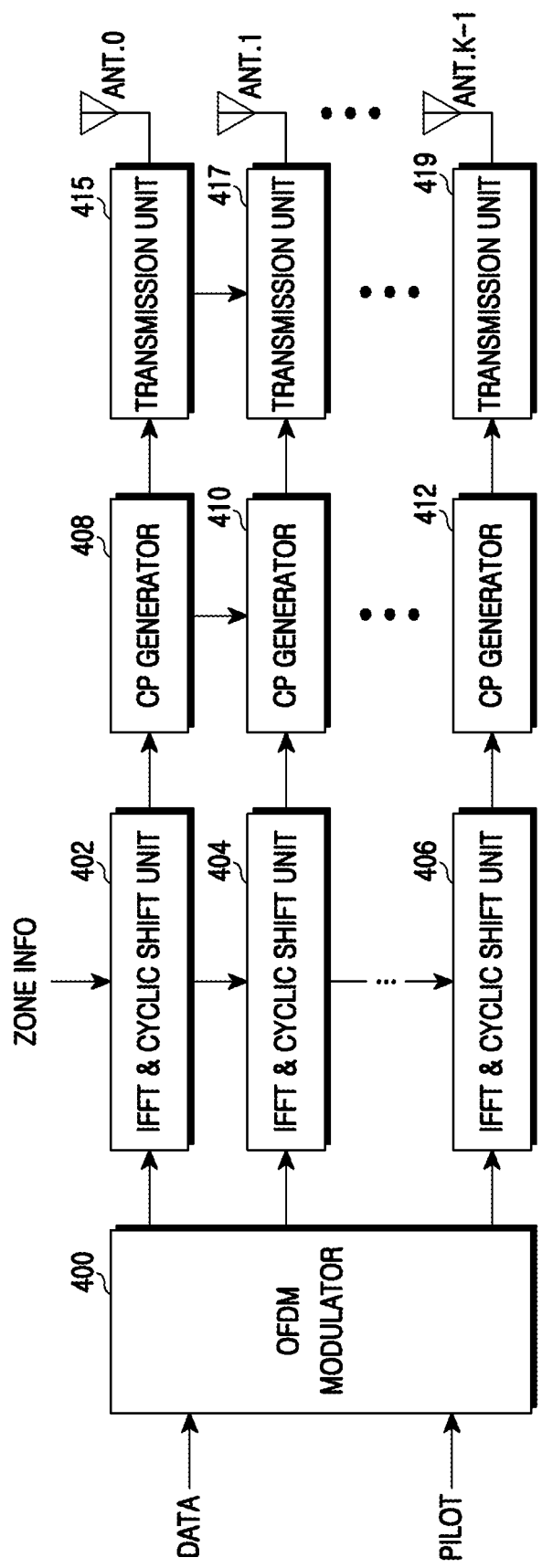
FIG. 4 is a block diagram illustrating a construction of a transmitter of a K-antenna OFDM system employing a Time-Varying CDD (TV-CDD) scheme according to an exemplary embodiment of the present invention.

FIG. 4 is a block diagram illustrating a construction of a transmitter of a K-antenna OFDM system employing a TV-CDD scheme according to an exemplary embodiment of the present invention. Here, the 'K' represents a number of antenna elements.

Referring to FIG. 4, the transmitter includes an OFDM modulator 400, Inverse Fast Fourier Transform (IFFT) and cyclic shift units 402, 404 and 406 for each antenna path, Cyclic Prefix (CP) generators 408, 410, and 412 for each antenna path, and transmission units 415, 417, and 419 for each antenna path.

The OFDM modulator 400 performs functions of channel encoding for data, interleaving, mapping to an OFDM symbol and frame structure, pilot signal insertion and modulation, etc.

The IFFT and cyclic shift units 402, 404, and 406 for each antenna path convert a parallel signal provided by the OFDM modulator 400 into time-domain sample data through IFFT and transmit the converted sample data to each antenna element. The IFFT and cyclic shift units 402, 404, and 406 apply a cyclic shift to a signal before or after IFFT for each antenna path. That is, each of the IFFT and cyclic shift units 402, 404, and 406 applies a suitable phase shift to each antenna signal before IFFT or applies a suitable temporal cyclic shift to each antenna signal after IFFT.

The CP generators 408, 410, 412 for each antenna path generate an OFDM symbol by inserting a CP into sample data applying a cyclic shift, which is received from the IFFT and cyclic shift units 402, 404, and 406. For example, the CP can be inserted by copying the last 'L' number of samples of the sample data applying the cyclic shift and attaching the copied samples to the front of the sample data to which the cyclic shift is applied.

The transmission units 415, 417, and 419 for each antenna path perform functions of transmitting/receiving and processing a wireless signal of data for transmission through a respective antenna. For example, in a transmission mode, the transmission units 415, 417, and 419 convert baseband signals, which are obtained by channel coding and spreading data to be transmitted, into Radio Frequency (RF) signals and transmit the converted signals through the respective antennas.

Figure 5:
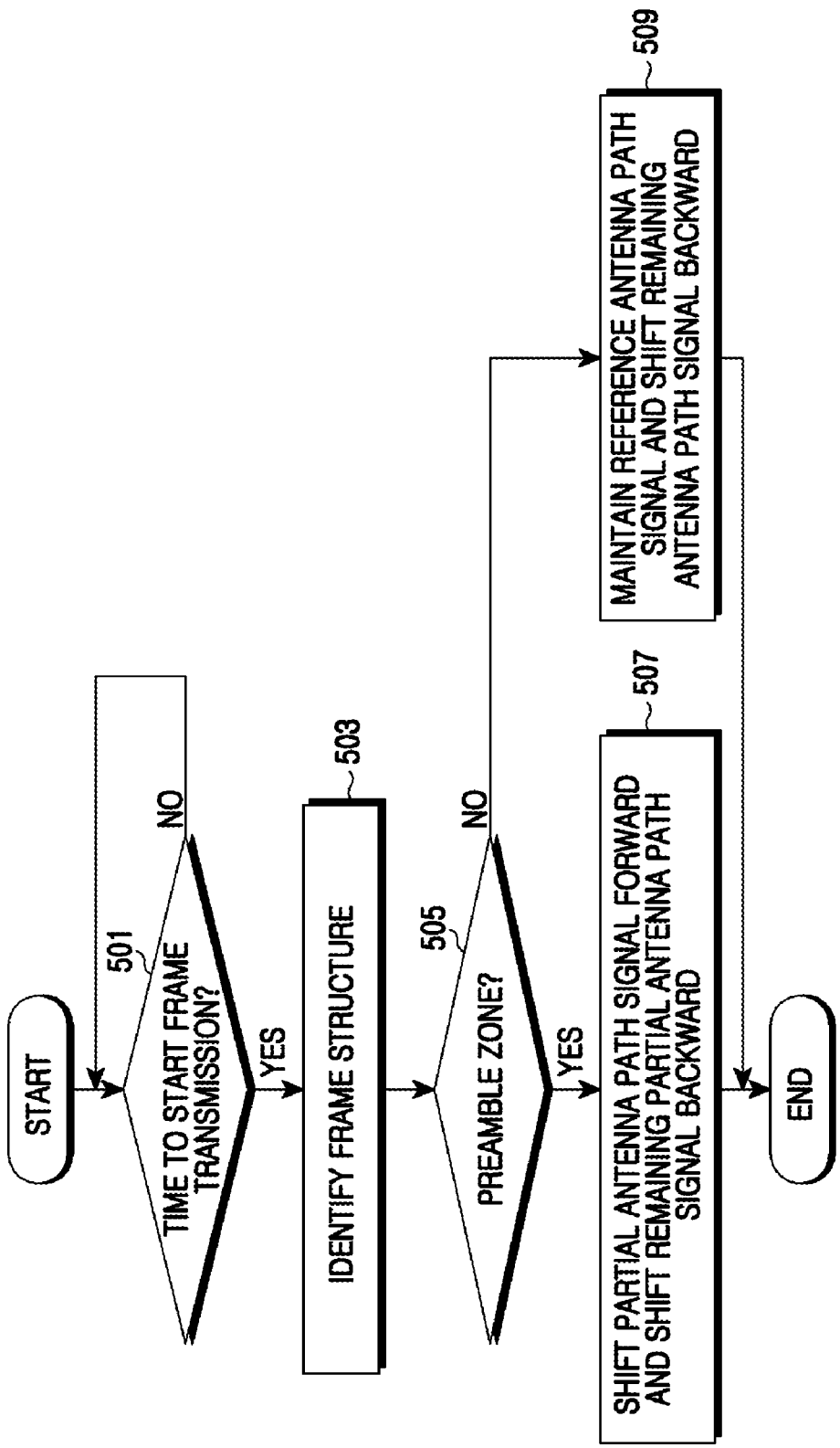
FIG. 5 is a flow diagram illustrating a process of applying a time-varying cyclic shift in a transmitter of an OFDM system employing a TV-CDD scheme according to an exemplary embodiment of the present invention.

FIG. 5 is a flow diagram illustrating a process of applying a time-varying cyclic shift in a transmitter of an OFDM system employing a TV-CDD scheme according to an exemplary embodiment of the present invention.

Referring to FIG. 5, in step 501, the transmitter identifies if it is time to start frame transmission. If it is time to start the frame transmission, in step 503, the transmitter identifies a structure of a current frame. The identifying of the structure of the current frame is implemented to determine if a current time either corresponds to a preamble zone including a signal that can be previously detected by a receiver such as a preamble among zones constituting the frame or corresponds to a data zone other than the preamble zone.

Then, in step 505, the transmitter determines if a current time corresponds to a preamble zone within the frame. If the current time corresponds to the preamble zone within the frame, the transmitter goes to step 507 and, if reference timing designates an accurate FFT sampling point of a data zone that is a demodulation target, shifts a partial antenna path signal forward compared to the reference timing and shifts (i.e., delays) a remaining partial antenna path signal backward compared to the reference timing in the preamble zone. For example, there is a method for setting such that a shift caused by each antenna path has a temporal symmetry centering on reference timing.

On the other hand, if the current time corresponds to the data zone within the frame, in step 509, the transmitter maintains a reference antenna path signal as it is, that is, does not shift the reference antenna path signal in time and does shift a remaining antenna path signal backward in time. However, in order to obtain a frequency selectivity targeting over the whole OFDM frame and an effect of constructive combination of a transmitted signal, a length of the whole cyclic shift of a preamble zone and data zones (i.e., a length from the most temporally prioritized position to the latest position when an antenna element has the same gain) or a frequency selectivity based on the length is set to be similar.

Then, the transmitter terminates the process according to an exemplary embodiment of the present invention.

Figure 6:
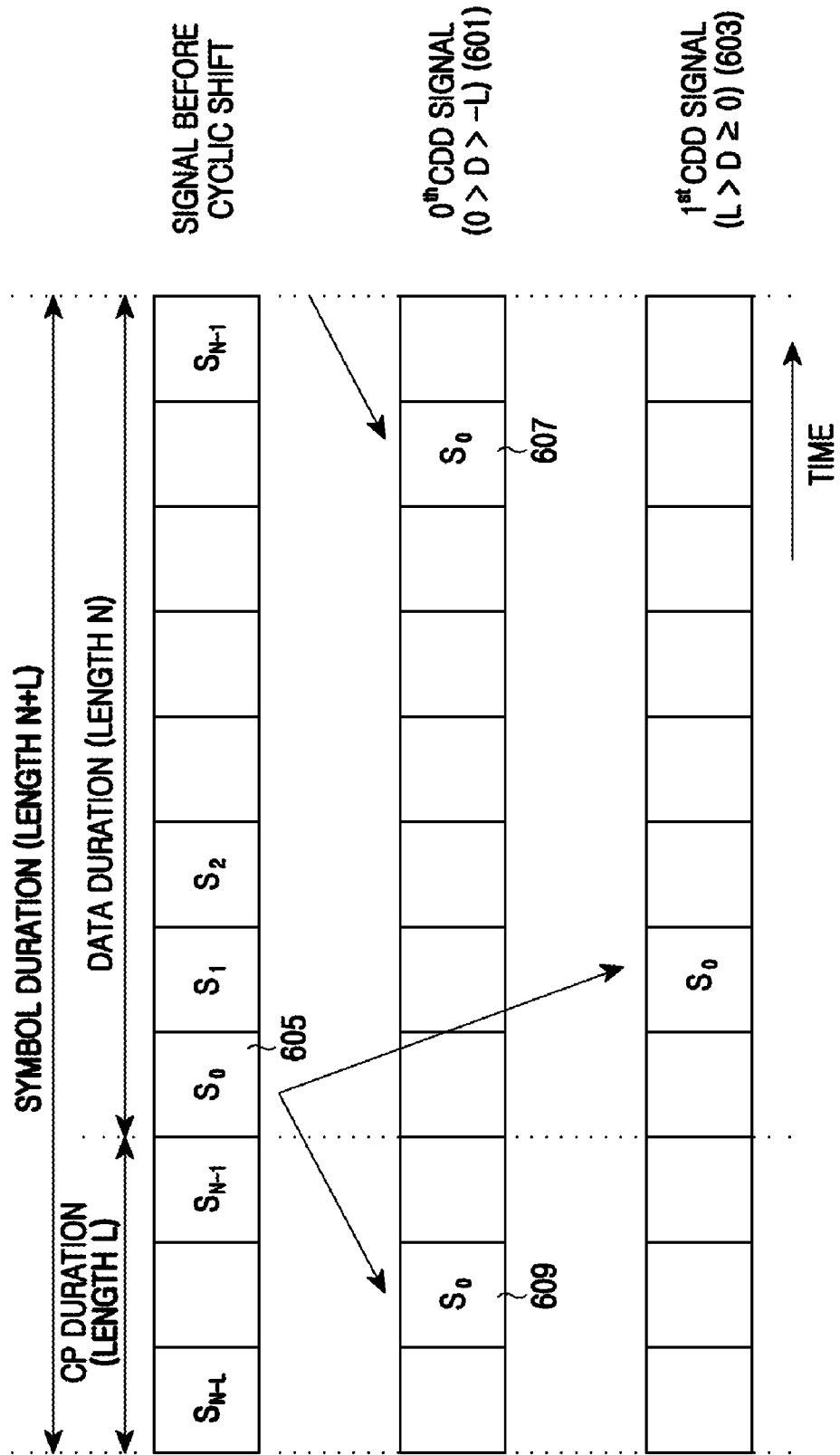
FIG. 6 is a diagram illustrating a time-varying cyclic shift application method in a preamble zone in an OFDM system employing a TV-CDD scheme according to an exemplary embodiment of the present invention.

FIG. 6 is a diagram illustrating a time-varying cyclic shift application method in a preamble zone in an OFDM system employing a TV-CDD scheme according to an exemplary embodiment of the present invention. In FIG. 6, a system having two antennas is illustrated as an example.

Referring to FIG. 6, a cyclic shift length (D) of a $0^{th}$ CDD signal 601 is equal to a negative number whose absolute value is less than a CP length (L), and a cyclic shift length (D) of a $1^{st}$ CDD signal 603 is equal to '0' or a positive number less than the 'L'. This means that the $0^{th}$ CDD signal 601 is generated by cyclically shifting a signal before applying a cyclic shift forward in time, and the $1^{st}$ CDD signal 603 is generated by cyclically shifting the signal backward in time or using the signal as it is.

A sample ($S_0$) 605 corresponds to a data duration start point of a signal before applying a cyclic shift. At a $0^{th}$ CDD signal of a preamble zone, the sample ($S_0$) 605 is shifted to the back 607 of a data duration in time while being copied to a CP duration 609.

Figure 7:
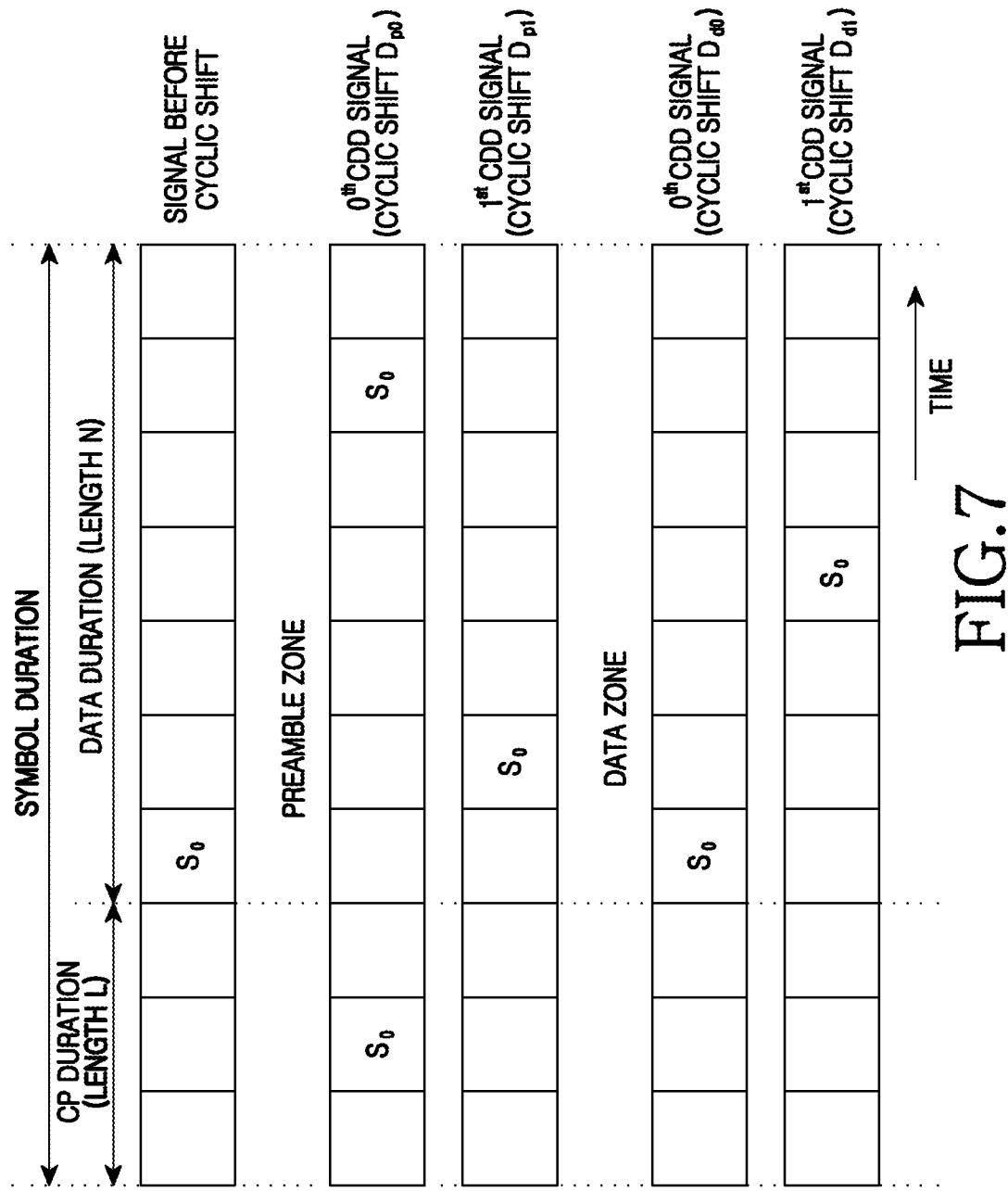
FIG. 7 is a diagram illustrating a time-varying cyclic shift application method in a preamble zone and data zone in an OFDM system employing a TV-CDD scheme according to an exemplary embodiment of the present invention.

FIG. 7 is a diagram illustrating a time-varying cyclic shift application method in a preamble zone and data zone in an OFDM system employing a TV-CDD scheme according to an exemplary embodiment of the present invention.

Referring to FIG. 7, '$D_{p0}$' and '$D_{p1}$' denote cyclic shift lengths of a $0^{th}$ CDD shift and $1^{st}$ CDD signal of a preamble zone, respectively. '$D_{d0}$' and '$D_{d1}$' denote cyclic shift lengths of a $0^{th}$ CDD signal and $1^{st}$ CDD signal of a data zone, respectively. In the preamble zone, the '$D_{p0}$' is equal to a negative number ($0>D_{p0}>-L$), and the $D_{p1}$ is equal to '0' or a positive number ($L>D_{p1}\geq0$) as illustrated as an example in FIG. 6.

In the data zone, the '$D_{d0}$' is equal to '0', that is, has no shift, and the '$D_{d1}$' is equal to a positive number ($L>D_{d1}$). One method for maintaining a frequency diversity effect in the preamble zone and data zone through the use of the TV-CDD scheme is to set a cyclic shift length such that $|D_{p0}-D_{p1}|$ and $|D_{d0}-D_{d1}|$ are similar with each other.

Figure 8:
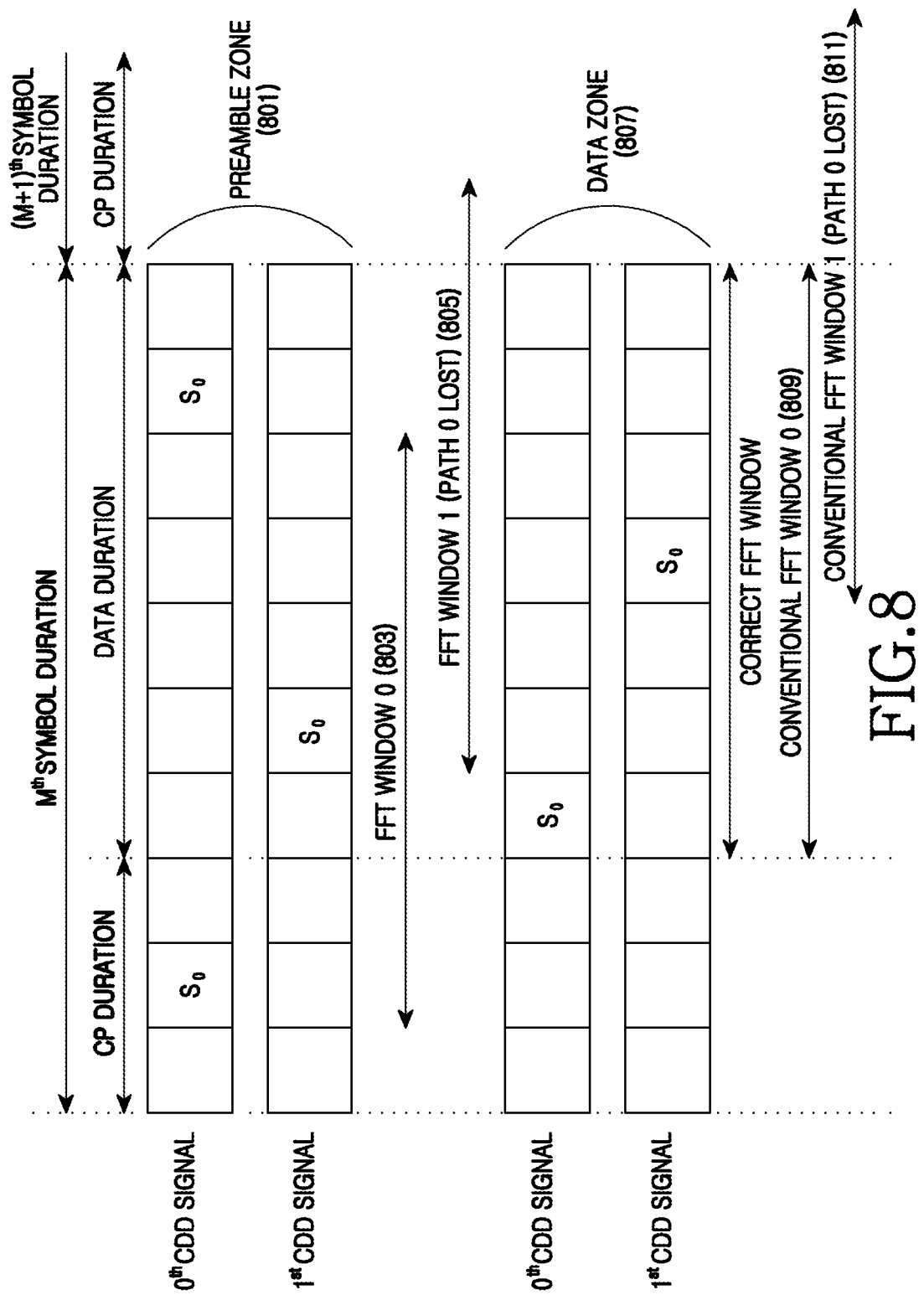
FIG. 8 is a diagram illustrating an effect of a receiver being capable of being acquired through time-varying cyclic shift application in an OFDM system employing a TV-CDD scheme according to an exemplary embodiment of the present invention.

FIG. 8 is a diagram illustrating an effect of a receiver being capable of being acquired through time-varying cyclic shift application in an OFDM system employing a TV-CDD scheme according to an exemplary embodiment of the present invention.

Figure 1:
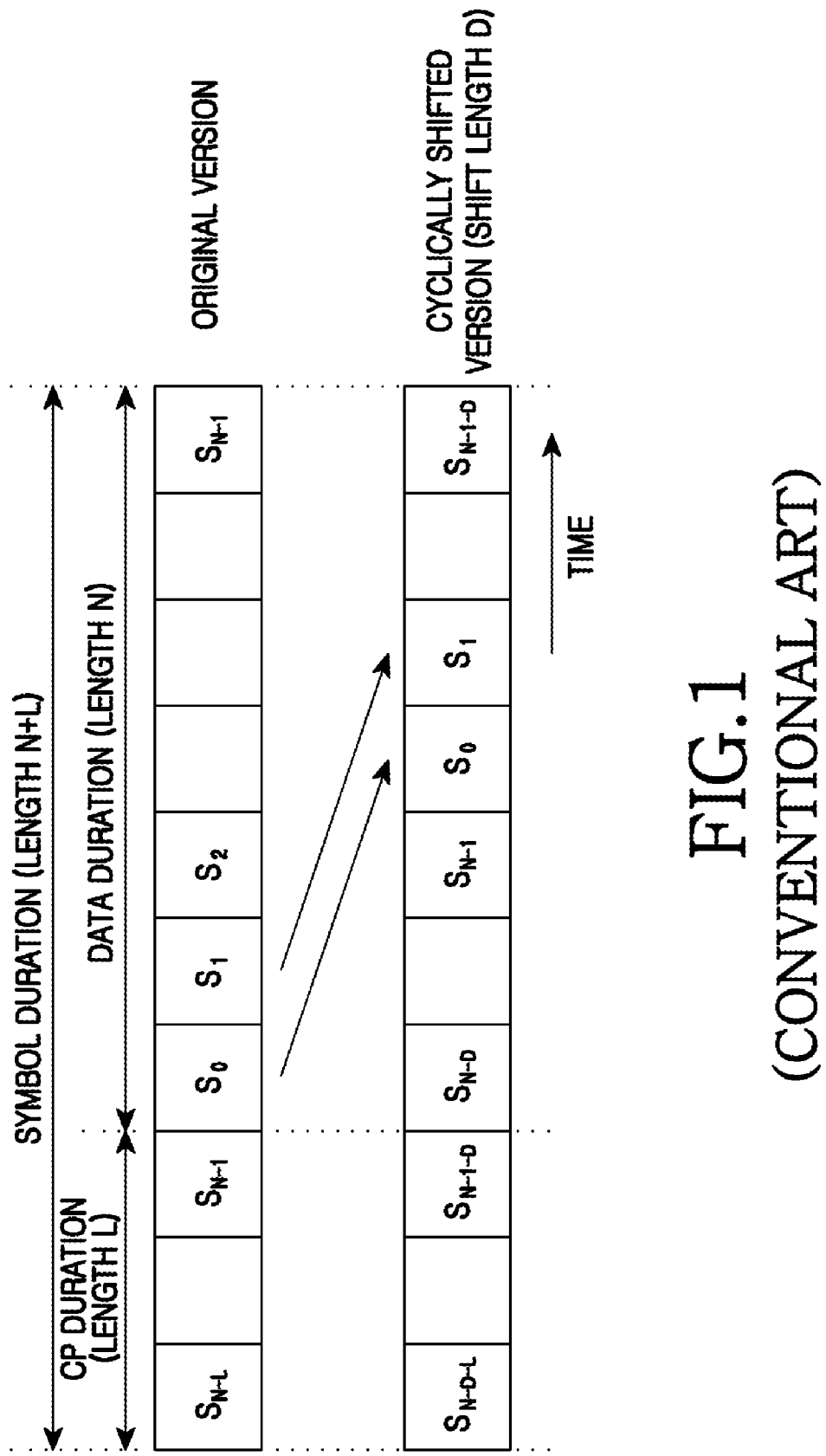
FIG. 1 is a diagram illustrating an example of cyclically shifting, by a D-sample duration, samples constituting an Orthogonal Frequency Division Multiplexing (OFDM) symbol in an OFDM system according to the conventional art.
Figure 2:
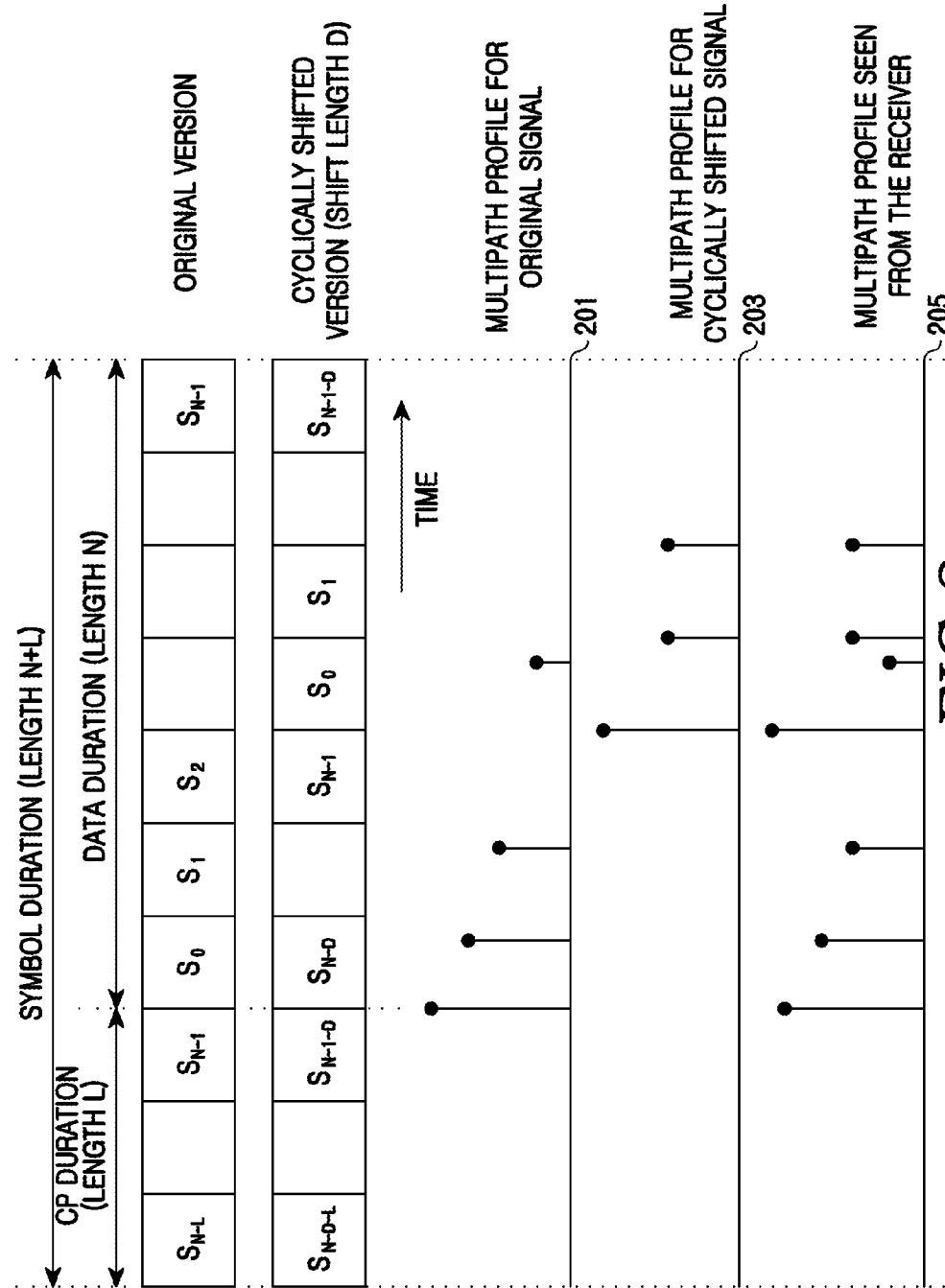
FIG. 2 is a diagram illustrating an example of a variation of a multipath profile of a received signal caused by Cyclic Delay Diversity (CDD) in a receiver of an OFDM system according to the conventional art.
Figure 3:
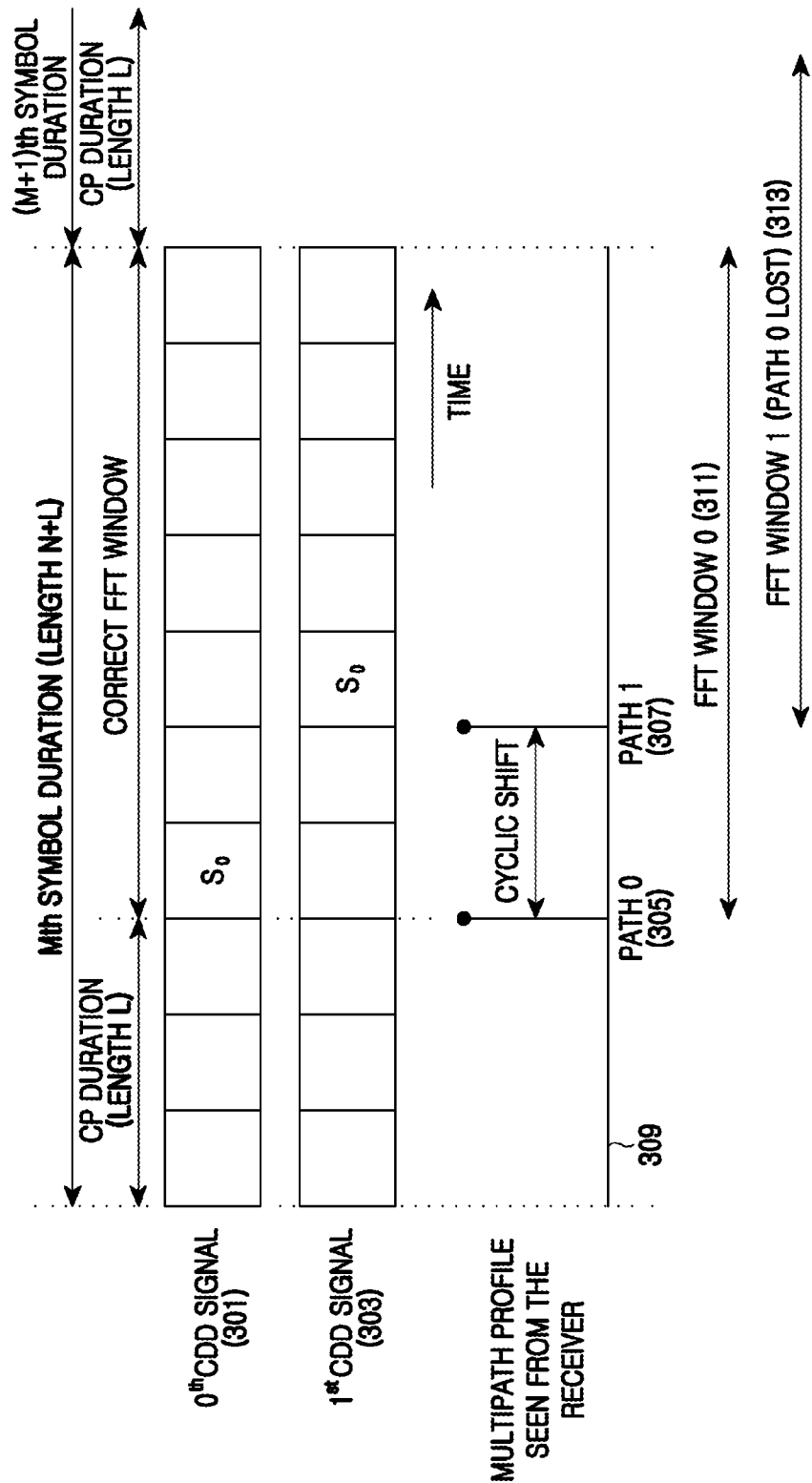
FIG. 3 is a diagram illustrating a process of generating an error of a selection of a Fast Fourier Transform (FFT) sampling point of a receiver and its influence in a 2-antenna OFDM system employing a CDD scheme according to the conventional art.

Referring to FIG. 8, a selection of an FFT sampling point using a preamble in a preamble zone 801 as proposed in an exemplary embodiment of the present invention is made for start positions of an FFT window 0 (803) and FFT window 1 (805). The aforementioned is different then the conventional CDD scheme of FIG. 3 in that a selection of an FFT sampling point when a preamble zone 801 and data zone 807 have the same cyclic shift application scheme is made earlier.

The conventional CDD scheme selects an accurate FFT sampling point or a point shifted by as much as a cyclic shift length compared to the FFT sampling point. In the former case (i.e., a conventional FFT window 0 (809)), there is no performance deterioration but, in the latter case (i.e., a conventional FFT window 1 (811)), ISI is generated proportionally to the cyclic shift length.

However, a scheme proposed in an exemplary embodiment of the present invention selects a position earlier than an accurate FFT sampling point such as an FFT window 0 (803) or a position later than the FFT sampling point such as an FFT window 1 (805). Thus, in the case of the FFT window 0 (803), ISI is not generated as long as an absolute value of a cyclic shift length is less than | CP duration length–channel shift spread |. In the case of the FFT window 1 (805), the ISI is reduced by a reduction of an FFT window duration overlapping with a CP duration of a next symbol compared to a conventional CDD scheme.

The FFT window 0 (803) includes all of demodulation-targeted data samples, and the FFT window 1 (805) loses a partial sample but its loss amount is slight. Thus, the scheme proposed in an exemplary embodiment of the present invention is advantageous in performance compared to the conventional scheme.

In addition, as time goes on, a multipath profile of a channel decreases. Thus, an amount of ISI on which a former symbol can have influence due to a channel shift spread is significantly smaller than ISI due to a CP sample of a next symbol.

As described above, exemplary embodiments of the present invention can obtain an effect of, by varying cyclic shift application schemes of a preamble zone and data zone in a wireless communication system employing a TV-CDD scheme, reducing an amount of ISI caused by an error of a selection of an FFT sampling point in a receiver of the wireless communication system, and improving performance of a capacity, a coverage, etc. of an OFDM system using the TV-CDD scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for applying a Time-Varying Cyclic Delay Diversity (TV-CDD) in a wireless communication system, the method comprising:
    determining whether there is a preamble zone or a data zone of a frame; and
    when there is the preamble zone of the frame, shifting each of a transmission timing of a partial antenna path signal corresponding to the preamble zone to a first timing and shifting a transmission timing of a remaining antenna path signal corresponding to the preamble zone to a second timing; and
    when there is the data zone of the frame, maintaining a timing of a reference antenna path signal and shifting each transmission timing of a remaining antenna path signal corresponding to the data zone to a third timing,
    wherein the first timing is earlier than a reference timing designating an accurate Fast Fourier Transform (FFT) sampling point of a data zone, and the second and the third timings are later than the reference timing.

2. The method of claim 1, wherein the reference timing comprises a start time of a Fast Fourier Transform (FFT) window.

3. The method of claim 1, wherein a shift value of the partial antenna path signal corresponding to the preamble zone and a shift value of the remaining antenna path signal corresponding to the preamble zone are the same in magnitude.

4. The method of claim 1, wherein a length of an entire shift for the partial antenna path signal corresponding to the preamble zone corresponds to a length of an entire shift for the remaining antenna path signal corresponding to the preamble zone.

5. The method of claim 1, wherein the signal of an antenna path to be transmitted is a signal processed by an IFFT operation.

6. The method of claim 1, further comprising inserting a Cyclic Prefix (CP) into the shifted signal of an antenna path for transmission.

7. An apparatus for applying a Time-Varying Cyclic Delay Diversity (TV-CDD) in a wireless communication system, the apparatus comprising:
an Inverse Fast Fourier Transform (IFFT) unit for performing an IFFT operation for a sampling data corresponding to a preamble zone of a frame or a sampling data corresponding to a data zone of the frame, to be transmitted; and
a cycle shift unit for determining whether there is the preamble zone of the frame or there is the data zone of the frame, and for, when there is the preamble zone of the frame, shifting each of a transmission timing of a partial antenna path signal corresponding to the preamble zone to a first timing and shifting a transmission timing of a remaining antenna path signal corresponding to the preamble zone to a second timing, and for, when there is the data zone of the frame, maintaining a reference antenna path signal and shifting each of a transmission timing of a remaining antenna path signal corresponding to the data zone to a third timing,
wherein the first timing is earlier than a reference timing designating an accurate Fast Fourier Transform (FFT) sampling point of a data zone, and the second and third timings are later than the reference timing.

8. The apparatus of claim 7, wherein the reference time comprises a start time of an FFT window.

9. The apparatus of claim 7, wherein a shift value of the partial antenna path signal corresponding to the preamble zone and a shift value of the remaining antenna path signal corresponding to the preamble zone are the same in magnitude.

10. The apparatus of claim 7, wherein a length of an entire shift for the partial antenna path signal corresponding to the preamble zone corresponds to a length of an entire shift for the remaining antenna path signal corresponding to the preamble zone.

11. The apparatus of claim 7, further comprising a Cyclic Prefix (CP) generator for inserting a CP into the shifted signal of an antenna path for transmission.

12. A method for applying a Time-Varying Cyclic Delay Diversity (TV-CDD) in a wireless communication system, the method comprising:
converting a plurality of signals corresponding to a plurality of antennas into a partial antenna path signal or a remaining antenna path signal of time domain each;
shifting a transmission timing of each of the antenna path signals, according to whether there is a preamble zone of a frame or there is a data zone of the frame;
inserting Cyclic Prefix (CP) in each of the shifted antenna path signals; and
transmitting each of the shifted antenna path signals inserted with the CP through the plurality of antennas,
wherein the step of shifting each of the antenna path signals according to whether there is a preamble zone of a frame or there is a data zone of the frame, comprises:
determining a reference antenna path signal designating an accurate Fast Fourier Transform (FFT) sampling point of a data zone of the converted plurality of antenna path signals;
when there is the preamble zone of the frame, shifting a first one of the converted plurality of antenna path signals except the reference antenna path signal, to a first timing which is earlier than a transmission timing of the reference antenna path signal, and shifting a second one of the converted plurality of antenna path signals except the reference antenna path signal, to a second timing which is later than a transmission timing of the reference antenna path signal; and
when there is the data zone of the frame, maintaining the reference antenna path signal and shifting all the converted plurality of antenna path signals except the reference antenna path signal, to a third timing which is later than a transmission timing of the reference antenna path signal.

13. The apparatus of claim 12, wherein a shift value of the partial antenna path signal corresponding to the preamble zone and a shift value of the remaining antenna path signal corresponding to the preamble zone are the same in magnitude.

14. The apparatus of claim 12, wherein a length of an entire shift for the partial antenna path signal corresponding to the preamble zone corresponds to a length of an entire shift for the remaining antenna path signal corresponding to the preamble zone.

15. An apparatus for applying a Time-Varying Cyclic Delay Diversity (TV-CDD) in a wireless communication system, the apparatus comprising:
a plurality of Inverse Fast Fourier Transform (IFFT) units for converting a plurality of signals corresponding to a plurality of antennas into a partial antenna path signal or a remaining antenna path signal of time domain each;
a plurality of cycle shift units for shifting a timing of each of the antenna path signals, according to whether there is a preamble zone of a frame or there is a data zone of the frame;
a plurality of Cyclic Prefix (CP) generators for inserting CP in each of the shifted antenna path signals; and
a plurality of transmitters for transmitting each of the shifted antenna path signals inserted with the CP through the plurality of antennas,
wherein each of the cycle shift units:
determines a reference antenna path signal of the converted plurality of antenna path signals;
when there is the preamble zone of the frame, shifts a first one of the converted plurality of antenna path signals, except the reference antenna path signal, to a first timing which is earlier than a transmission timing of the reference antenna path signal, and shifts a second one of the converted plurality of antenna path signals, except the reference antenna path signal, to a second timing which is later than a transmission timing of the reference antenna path signal; and
when there is the data zone of the frame, shifts all the converted plurality of antenna path signals except the reference antenna path signal, to the third timing which is later than a transmission timing of the reference antenna path signal.

16. The apparatus of claim 15, wherein a shift value of the partial antenna path signal corresponding to the preamble zone and a shift value of the remaining antenna path signal corresponding to the preamble zone are the same in magnitude.

17. The apparatus of claim 15, wherein a length of entire shift for the partial antenna path signal corresponding to the preamble zone corresponds to a length of entire shift for the remaining antenna path signal corresponding to the preamble zone.

* * * * *